United States Patent [19]

Nock

[11] Patent Number: 6,038,565
[45] Date of Patent: Mar. 14, 2000

[54] OBJECT ORIENTED DATA FORMAT MAPPING MECHANISM

[75] Inventor: Clifton Malcolm Nock, Rochester, Minn.

[73] Assignee: International Business Machines Corporation, Armonk, N.Y.

[21] Appl. No.: 09/007,970

[22] Filed: Jan. 16, 1998

[51] Int. Cl.[7] .................................................. G06F 17/30
[52] U.S. Cl. ............................................ 707/101; 707/103
[58] Field of Search ..................................... 707/101, 103

[56] References Cited

U.S. PATENT DOCUMENTS

| | | | |
|---|---|---|---|
| 5,058,000 | 10/1991 | Cox | 707/10 |
| 5,432,925 | 7/1995 | Abraham et al. | 709/301 |
| 5,708,828 | 1/1998 | Coleman | 707/523 |
| 5,832,498 | 11/1998 | Exertier | 707/103 |

*Primary Examiner*—Thomas G. Black
*Assistant Examiner*—William Trinh
*Attorney, Agent, or Firm*—Martin & Associates, L.L.C.; Derek P. Martin

[57] ABSTRACT

An object oriented data format mapping mechanism provides a framework for mapping data from one or more stored formats to a desired format without custom-generating the conversion code from scratch. The extensible portions of the framework allow a programmer to extend the framework to define a particular data format mapping environment. The framework maps all data to rows, with individual data being accessed by specifying an index within the row. One or more mapped rows define entries in the desired format, but instead of containing data, they contain method calls to classes that perform the desired retrieval and/or manipulation of the data.

24 Claims, 9 Drawing Sheets

Database

| Index | Contents |
|---|---|
| 0 | Name |
| 1 | AC + Phone# (no dashes) |

FIG. 2

CDROM

| Index | Contents |
|---|---|
| 0 | Name, AC + Phone# (with dashes) |

FIG. 3

Network

| Index | Contents |
|---|---|
| 0 | Address |
| 1 | City |
| 2 | State |
| 3 | ZIP |
| 4 | Name |
| 5 | Area Code |
| 6 | Phone# (no dashes) |

FIG. 4

| Index | Contents |
|---|---|
| 0 | Name |
| 1 | AC + Phone# (with dashes) |

FIG. 7

Database Row

| 0 | SimpleMap(0) |
|---|---|
| 1 | PhoneAddDashesMap(1) |

FIG. 8

CDROM Row

| 0 | ParseNameMap(0) |
|---|---|
| 1 | ParsePhoneMap(0) |

FIG. 9

Network Row

| 0 | SimpleMap(4) |
|---|---|
| 1 | PhoneAddDashesMap(Combine AreaCodeAndPhoneMap(5,6)) |

FIG. 10

```
public class SimpleMap implements Map { private int sourceIndex_;

public SimpleMap (int sourceIndex) {
        sourceIndex_ = sourceIndex;
    } public Object mapFrom (Row row) {
        return row.get (sourceIndex_);
    }
}
```

FIG. 12

```
public class PhoneAddDashesMap extends SimpleMap { public PhoneAddDashesMap (int sourceIndex) {
        super (sourceIndex);
    } public Object mapFrom (Row row) {
        Object phoneNoDashes = super.mapFrom(row);
        StringBuffer phoneWithDashes = new StringBuffer(phoneNoDashes);
        phoneWithDashes.insert (3, '-');
        phoneWithDashes.insert (7, '-');
        return phoneWithDashes.toString();
    }
}
```

FIG. 13

```
public class ParseNameMap extends SimpleMap { public ParseNameMap (int sourceIndex) {
        super (sourceIndex);
    } public Object mapFrom (Row row) {
        String fullString = super.mapFrom(row).toString();
        index commaPosition = fullString.indexOf(',');
        String name = fullString.substring(0, commaPosition-1);
        return name;
    }
}
```

FIG. 14

```
public class ParsePhoneMap extends SimpleMap { public ParsePhoneMap (int sourceIndex) {
            super (sourceIndex);
    }
                                                        FIG. 15
    public Object mapFrom (Row row) {
            String fullString = super.mapFrom(row).toString();
            index commaPosition = fullString.indexOf(',');
            String phone = fullString.substring(0, commaPosition+1);
            return phone;
    }
}
```

```
public class CombineAreaCodeAndPhoneMap { private int areaCodeSourceIndex_;
    private int phoneSourceIndex_;

public CombineAreaCodeAndPhoneMap (int areaCodeSourceIndex,
                                                    int phoneSourceIndex) {
            areaCodeSourceIndex_ = areaCodeSourceIndex;
            phoneSourceIndex_ = phoneSourceIndex;
    }
                                                        FIG. 16
    public Object mapFrom (Row row) {
            String areaCode = row.get (areaCodeSourceIndex_);
            String phone = row.get (phoneSourceIndex_);
            StringBuffer combined = new StringBuffer();
            combined.append (areaCode);
            combined.append (phone);
            return combined.toString();
    }
}
```

```
Database database = new Database();
CDROMFile cdRomFile = new CDROMFile();
NetworkReply networkReply = new NetworkReply();

DatabaseRow[ ] databaseRows = database.getEntries();
CDROMRow[ ] cdRomRows = cdRomFile.getEntries();
NetworkRow[ ] networkRows = networkReply.getEntries();

int numberOfEntries = databaseRows.length + cdRomRows.length +
networkRows.length;
Row[ ] entries = new Row[numberOfEntries];
int rowCount = 0;

Map[ ] databaseMaps = new Map[2];
    databaseMaps[0] = new SimpleMap(0);
    databaseMaps[1] = new PhoneAddDashesMap(1);
    for (int i=0; i<cdRomRows.length; ++i; ++rowCount)
        entries[rowCount] = new MappedRow(databaseRows[i],
databaseMaps);

Map[ ] cdRomMaps = new Map[2];
    cdRomMaps[0] = new ParseNameMap(0);
    cdRomMaps[1] = newParsePhoneMap(0);
    for (int i=0; i<cdRomRows.length; ++i; ++rowCount)
        entries[rowCount] = new MappedRow(cdRomRows[i], cdRomMaps);

Map[ ] networkStage1Maps = new Map[2];
    networkStage1Maps[0] = new SimpleMap(4);
    networkStage1Maps[1] = new CombineAreaCodeAndPhoneMap(5,6);

Map[ ] networkStage2Maps = new Map[2];
    networkStage2Maps[0] = new SimpleMap(0);
    networkStage2Maps[1] = new PhoneAddDashesMap(1);

for (int i=0; i<networkRows.length; ++i; ++rowCount) {
    MappedRow stage1MappedRow = new MappedRow(networkRows[i],
networkStage1Maps);
    MappedRow stage2MappedRow = new MappedRow(stage1MappedRow,
networkStage2Maps);
    entries[rowCount] = stage2MappedRow;
}
```

FIG. 17

OBJECT ORIENTED DATA FORMAT MAPPING MECHANISM

BACKGROUND OF THE INVENTION

1. Technical Field

This invention generally relates to the data processing field. More specifically, this invention relates to the field of accessing data stored in different formats in an object-oriented system.

2. Background Art

The development of the EDVAC computer system of 1948 is often cited as the beginning of the computer era. Since that time computers have become indispensable in many fields of human endeavor including engineering design, machine and process control, and information storage and access. One of the primary uses of computers is for information storage and retrieval.

Database systems have been developed that allow a computer to store a large amount of information in a way that allows a user to search for specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database. Databases have been traditionally organized into row and column format, with individual pieces of data being identified by a row and an index within the row.

The format of different databases may vary greatly. Referring to FIG. 2, one specific database may store a person's name at index 0 of a row, with the area code and phone number stored without dashes in index 1. The same information may be stored on a CDROM in a different format. For example, referring to FIG. 3, a CDROM may have the name, area code, and phone number for a person at index 0, with the name and phone number separated by a comma. Name and phone number information may also be available from a database across a network. Referring to FIG. 4, a network database may include more information about a person, including the person's address, city, state, ZIP, name, area code, and phone number. If only the name, area code, and phone number are of interest, these pertinent pieces of data can be extracted as needed.

As the simplified example of FIGS. 2–4 illustrates, the data formats of different data sources can vary widely. These varying data formats make it difficult for a software application to access data from different data sources. In essence, the software application that wants to access the name and phone number from the three data sources of FIGS. 2–4 must include custom drivers that make the translation from the format of the data source to the desired format. Manually customizing an application to provide these drivers is expensive and time-consuming. Without a way to easily customize a software application so it can access data stored in different formats, the computer industry will continue to suffer from excessively expensive methods of accessing data stored in different formats.

DISCLOSURE OF INVENTION

According to the present invention, an object oriented data format mapping mechanism provides a framework for mapping data from one or more stored formats to a desired format without custom-generating the conversion code from scratch. The extensible portions of the framework allow a programmer to extend the framework to define a particular data format mapping environment. The framework maps all data to rows, with individual data being accessed by specifying an index within the row. One or more mapped rows define entries in the desired format, but instead of containing data, they contain method calls to classes that perform the desired retrieval and/or manipulation of the data.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIGS. 2–4 are block diagrams of data stored in three different formats;

FIG. 7 is a block diagram showing a desired common format for accessing name and phone number data stored in the databases shown in FIGS. 2–4;

FIG. 8 is a block diagram showing the mapping from the desired format of FIG. 7 to the database format of FIG. 2;

FIG. 9 is a block diagram showing the mapping from the desired format of FIG. 7 to the CDROM format of FIG. 3;

FIG. 10 is a block diagram showing the mapping from the desired format of FIG. 7 to the network format of FIG. 4;

FIGS. 12–17 illustrate portions of Java pseudo-code for implementing the extended framework of FIG. 11.

BEST MODE FOR CARRYING OUT THE INVENTION

Figure 1:
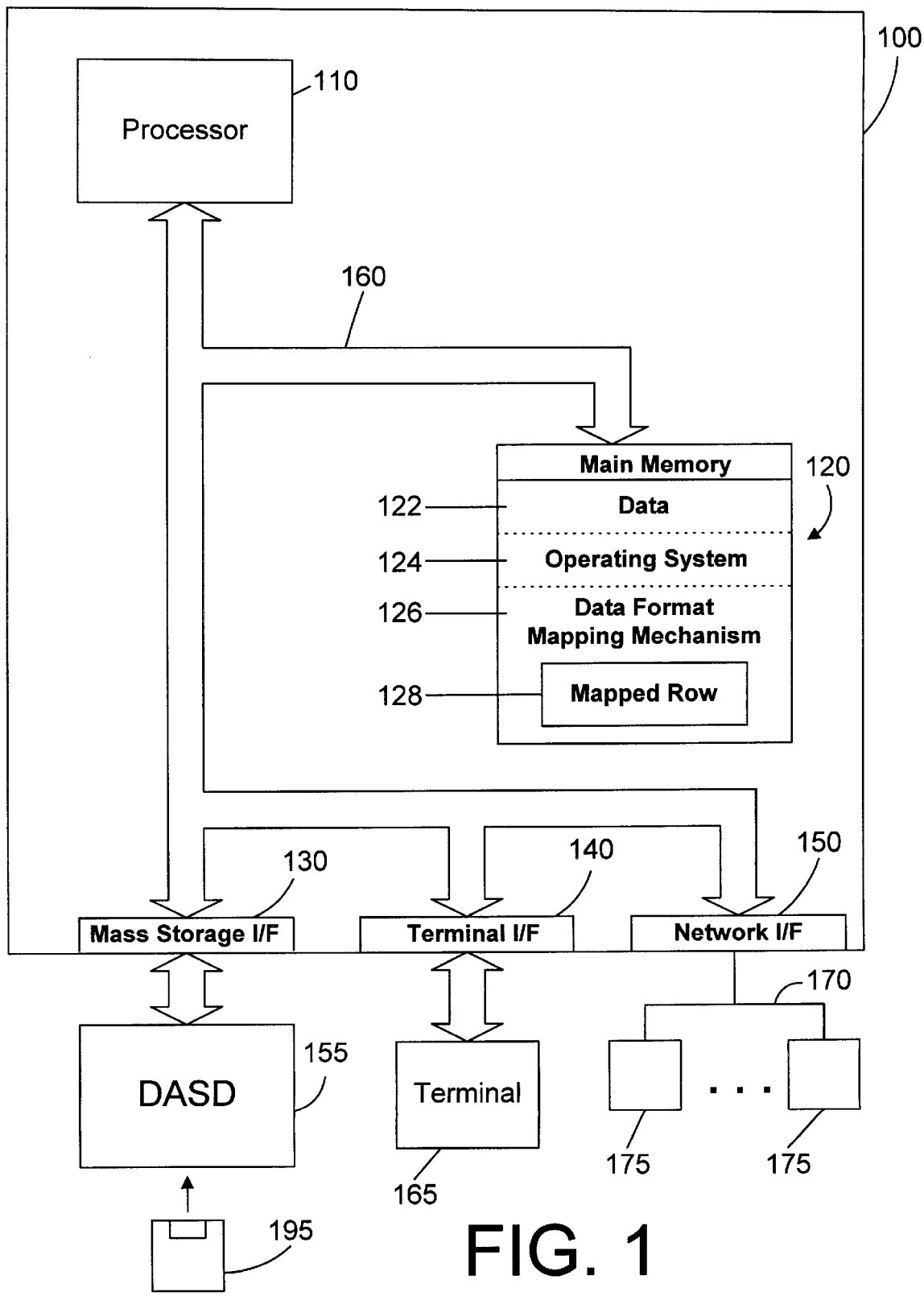
FIG. 1 is a block diagram of an apparatus in accordance with a preferred embodiment of the present invention.

The present invention is accomplished through the use of object oriented programming concepts. For those who are not familiar with object oriented programming concepts, the brief overview below provides background information that will help the reader to understand the present invention.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

A central concept in object oriented programming is the "class." A class is a template that defines a type of object. A class outlines or describes the characteristics or makeup of objects that belong to that class. By defining a class, objects can be created that belong to the class without having to rewrite the entire definition for each new object as it is created. This feature of object oriented programing promotes the reusability of existing object definitions and promotes more efficient use of program code.

There are many computer languages that presently support object oriented programming techniques. For example, Smalltalk, Object Pascal, C++ and Java are all examples of programming languages that support object oriented programming to one degree or another.

Object Oriented Frameworks

Although object-oriented programming offers significant improvements over other programming types, program development still requires significant amounts of time and effort, especially if no preexisting objects are available as a starting point. Consequently, one approach has been to provide a program developer with a set of pre-defined, interconnected classes that create a set of objects. Such pre-defined classes and libraries are typically called object frameworks. Frameworks essentially provide a prefabricated structure for a working program by defining certain classes, class relationships, and methods that a programmer may easily use by appropriate subclassing to generate a new object-oriented program.

2. Detailed Description

According to a preferred embodiment of the present invention, an object oriented framework mechanism provides mapping from one or more stored formats to a desired format by defining one or more mapped rows that define in the desired format methods that may be invoked to perform the desired mapping. The framework mechanism is extended by a programmer to define one or more maps that are used to perform the required conversions in each mapped row.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected by a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, and a data format mapping mechanism 126. Data format mapping mechanism 126 includes one or more mapped rows 128 that map data from the format the data is stored in to a desired format Computer system 100 utilizes well known virtual addressing mechanisms that allow the programs of computer system 100 to behave as if they only have access to a large, single storage entity instead of access to multiple, smaller storage entities such as main memory 120 and DASD 155. Therefore, while data 122, operating system 124, and data format mapping mechanism 126, including mapped row 128, are shown to reside in main memory 120, those skilled in the art will recognize that these programs are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Operating system 124 is a multitasking operating system known in the industry as OS/400; however, those skilled in the art will appreciate that the spirit and scope of the present invention is not limited to any one operating system. Operating system 124 preferably supports an object oriented programming environment such as that provided, for example, by the Java programming language.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions of data format mapping mechanism 126 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 5:
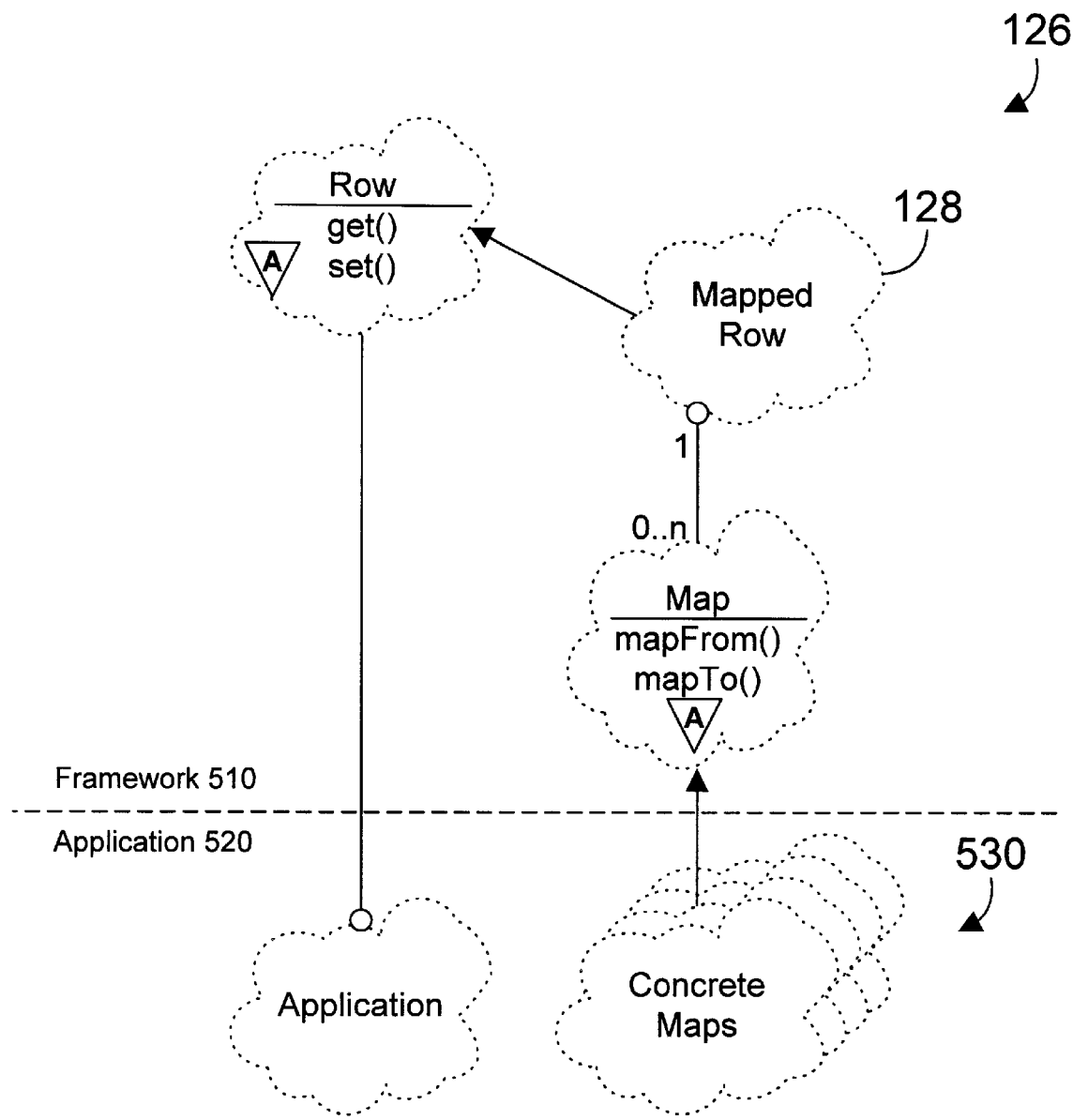
FIG. 5 is a class diagram an extensible data format mapping mechanism in accordance with a preferred embodiment.

The remainder of this specification describes the details of data format mapping mechanism 126 in FIG. 1. For the convenience of explaining the invention herein, data format mapping mechanism 126 is said to map data from a "stored format" into a "desired format." Note that data format mapping mechanism 126 is capable of converting from numerous stored formats into a single desired format, as shown by the examples explained below. Referring to FIG. 5, data format mapping mechanism 126 is preferably implemented by an application 520 suitably extending an object oriented framework mechanism 510. Framework mechanism 510 includes a Row class, a MappedRow class, and a Map class. The basic abstraction for a set of data in framework mechanism 510 is a row, as represented by the Row class. A row of data is conceptually an array of any number of objects, accessible using an integer index from 0 to n. It is important to realize that the Row class is an abstraction, and the implementation of the abstraction does not necessarily require the row to physically contain the data. Instead, the row could access data anywhere, such as in main memory 120, in DASD 155 or on the Internet.

The Row class is an abstract class, meaning that a user must extend the Row class by defining one or more mapped rows to define the desired attributes, such as methods, on the class. The Row class includes methods get( ) and set( ). When the get( ) method is called, an index i is passed as a parameter, so get(i) returns the object reference at index i within the row. When the set( ) method is called, an index i is specified as a parameter, and an object reference is specified as a parameter. Thus, set(int i, Object) results in the reference for Object being stored in the row at index i.

Map is an abstract class, indicating that a user of the framework will extend Map to specify one or more concrete subclasses of map. The Map class includes two methods mapFrom( ) and mapTo( ). When the mapFrom( ) method is called, the row is passed as a parameter, so mapFrom(row) returns the object reference derived from the set of objects in the stored format. When the mapTo( ) method is called, the row and object reference are specified as parameters. MapTo( ) suitably performs the reverse mapping of mapFrom( ). Thus, mapTo(Row, Object) stores the object passed as a parameter in the stored format.

MappedRow is a subclass of the row class, thereby inheriting all the behavior of the Row class. MappedRow has a using relationship with the Map class, indicating that the MappedRow class may invoke methods on the Map class or on its subclasses. MappedRow is an implementation of the Row class that gets its data from a row in another format based on a set of Map objects. MappedRow implements the get( ) and set( ) methods of the Row class in terms of its maps. The maps perform the appropriate mappings as needed from the stored format to the desired format, and vice versa. The application can treat a mapped row as an ordinary row. The application accesses data by invoking the get( ) or set( ) methods on the MappedRow class. The get( ) or set( ) methods do all the mapping work at the time these methods are called. Because the mapping is done on-the-fly, performance is based on the number of accesses and is concentrated at each such access. Note that very complex mappings are possible by basing a mapped row on another mapped row, and so on, until the desired mapping takes place.

An application 520 uses the framework 510 of FIG. 5 by extending the Row class to define one or more MappedRows 128, thereby defining the attributes of a row of data to be accessed. In addition, application 520 extends the Map abstract class to define the concrete subclasses 530 of the Map class that define how data is mapped from one or more stored formats to the desired format.

Figure 6:
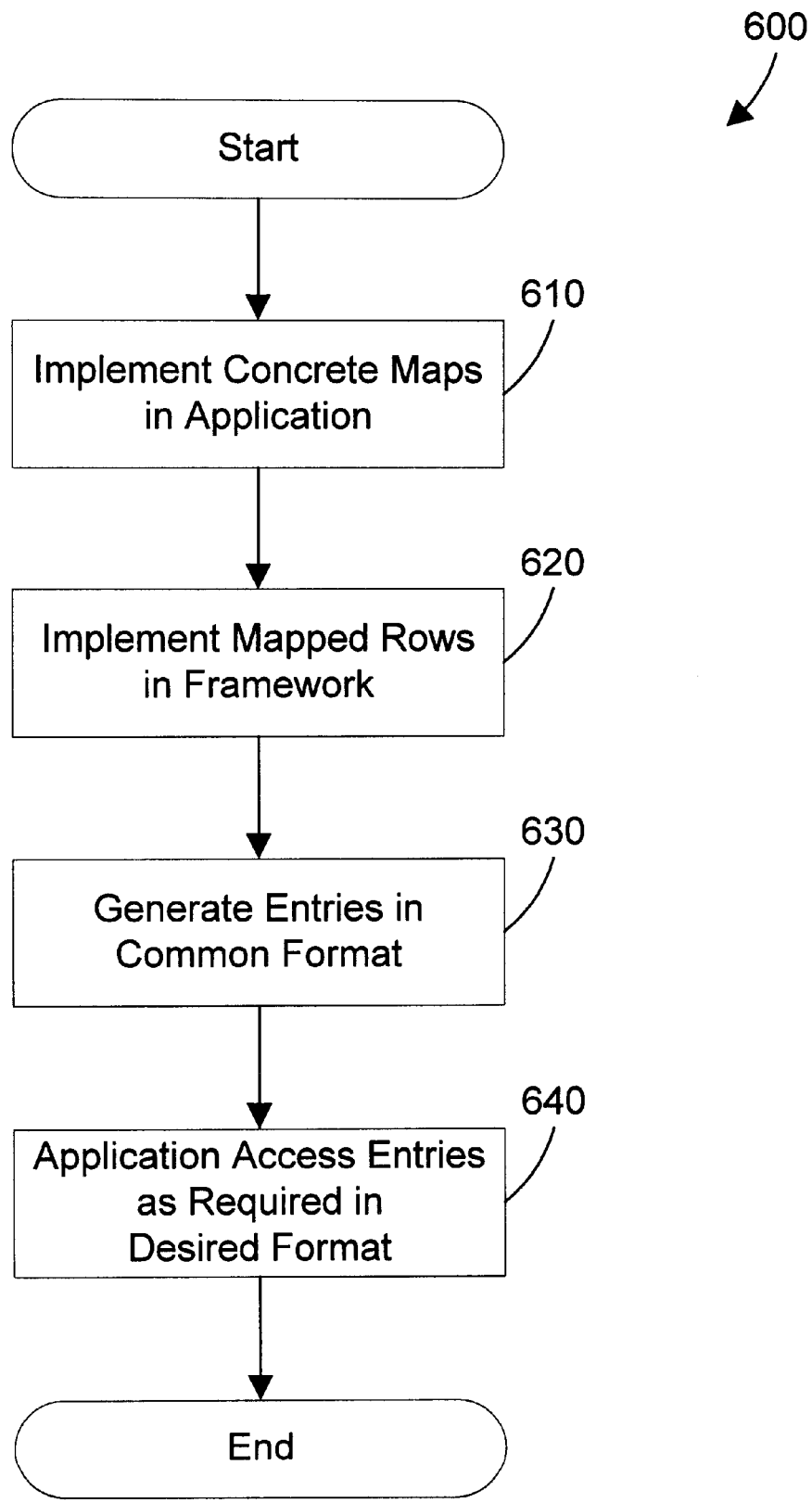
FIG. 6 is a flow diagram of a method for accessing data stored in different formats according to a preferred embodiment.

Referring to FIG. 6, data format mapping mechanism 126 suitably performs the steps of a method 600 for accessing data in different formats. First, the concrete maps 530, which are concrete subclasses of the map class in the framework, are defined (step 610). Next, the MappedRow class in the framework is implemented to provide the desired mapping between one or more stored formats into the desired format (step 620). Entries in the desired format are then generated (step 630), which provides mapped rows that have objects rather than data. Finally, the application accesses the entries, which are in the desired format (step 640). Data format mapping mechanism 126 thus allows a programmer to quickly and efficiently implement mappings from one or more stored formats to a desired format by extending framework 510 rather than generating the conversion code from scratch.

The power of implementing data format mapping mechanism 126 using an extensible framework 510 as shown in FIG. 5 is shown by a specific example. The specific data format mapping environment for the purposes of illustration assumes three data sources with name and telephone numbers stored in different formats, as shown in the stored formats of FIGS. 2–4. Furthermore, the data format mapping environment assumes for purposes of illustrating the invention that the desired format is to have the name at index 0, with the area code and phone number with dashes stored at index 1, as shown in FIG. 7.

Figure 11:
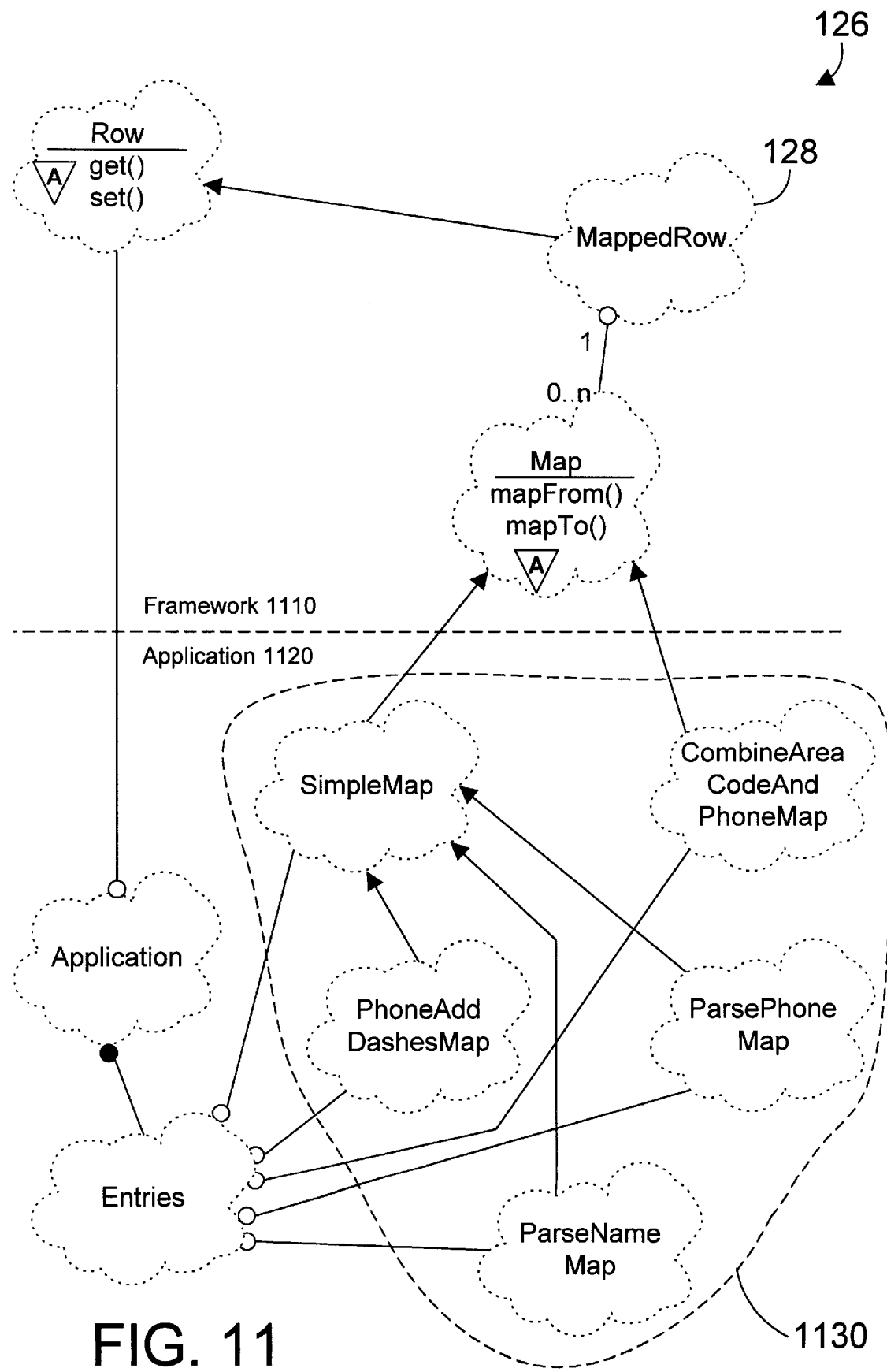
FIG. 11 is a class diagram showing the extension of the framework of FIG. 5 to perform the data mapping for the three data sources in FIGS. 2–4.

The basic idea in providing the mapping from the Database format, CDROM format, and Network format in FIGS. 2–4 to the desired format in FIG. 7 is to generate a mapped row for each of these different formats that generates method calls, when needed, to perform the desired mapping. Referring to FIG. 11, framework 510 of FIG. 5 has been extended to generate an extended framework 1110, and application 1120 has extended the user-extensible portions of framework 1110 to provide the desired mappings for the specific example presented herein. Namely, application 1120 includes a set of maps 1130 that perform all the required mappings for this example. A SimpleMap class is used to perform a direct mapping from one row index to another row index. A PhoneAddDashesMap is a subclass of SimpleMap that defines one or more methods for adding dashes to a phone number that does not have dashes. ParseNameMap is a subclass of SimpleMap that defines one or more methods for parsing the name from a CDROM row index that includes both a name and a phone number. In similar fashion, ParsePhoneMap is a subclass of SimpleMap that defines one or more methods for parsing the phone number from a CDROM row index that includes both a name and a phone number. The CombineAreaCodeAndPhoneMap class is a concrete subclass of the map abstract class in framework 1110 that defines one or more methods for combining the area code and phone number of two network row indexes into a single row index in the desired format. The Entries class defines a list of entries in the application that use various methods on the concrete map subclasses to perform the desired mappings. While the high-level structure of this particular example is shown in FIG. 11, the details of its implementation are best understood in reference to the formats of FIGS. 8–10 and the Java pseudo-code in FIGS. 12–17.

Conceptually, one can inspect the data formats of FIGS. 24 and the desired format of FIG. 7 and determine what maps are needed in application 1120 to access data in the desired format of FIG. 7. For example, for the database format of FIG. 2, the area code and phone number are stored without dashes. The desired format (FIG. 7) has the area code and phone number stored with dashes. Therefore, we need a method that can take the area code and phone number of the database format of FIG. 2 and can add the required dashes. This method is defined by the PhoneAddDashesMap class. Thus, the mapped row for a database entry has a call to simpleMap(0) at index 0 that maps the name at index 0 in the stored format to index 0 in the mapped database row. In similar fashion, the mapped row for a database entry has a call to phoneAddDashesMap(1) to take the data at index 1 of the database and to add dashes at the appropriate places in the telephone number. The resulting database mapped row is illustrated in FIG. 8. In this manner, the mapped row for the database has the indexes that correspond to the desired format in FIG. 7, but instead of data, the mapped rows contain method calls on classes that can dynamically perform the desired mappings as required. This mapping approach eliminates the need to convert an entire existing database to a new format when only a small amount of data in the database is required. By providing this dynamic mapping capability, data is dynamically converted as it is needed.

For the CDROM format of FIG. 3, the name and phone number need to be separated out into separate indexes in the desired format of FIG. 7. The classes ParseNameMap and ParsePhoneMap define methods that parse out the name and phone number, respectively, out of data stored at a CDROM index. The CDROM mapped row for this example is illustrated in FIG. 9, and includes a call to ParseNameMap(0) at index 0 and a call to parsePhoneMap(0) at index 1. Note that the index passed as a parameter to these methods is index 0 because the CDROM format has both the name and phone number stored at index 0, as shown in FIG. 3.

For the network format of FIG. 4, the name may be directly accessed at index 4. In this manner the desired format may be easily achieved by invoking the simpleMap (4) method, specifying that the data at index 4 of the stored format (FIG. 4) should be accessed when index 0 of the network row is accessed. The telephone number at index 6 is stored without dashes, and is stored separately from the area code at index 5. In order to access the area code plus phone number with dashes, as required by the desired method, a first method combineAreaCodeAndPhoneMap(5, 6) is invoked to combine the area code at index 5 and the telephone number at index 6 into one, and a second method phoneAddDashesMap( ) is invoked to add the required dashes to the newly combined telephone number. The resultant mapped row for this example is illustrated in FIG. 10.

The implementation of the methods of FIGS. 8–10 for this specific example are shown Java pseudo-code in FIGS. 12–17. Referring to FIG. 12, the SimpleMap class includes a method SimpleMap( ) that maps a stored index to a corresponding desired index. For example, the Name in the database format of FIG. 2 is at index 0. Because the name is needed in the desired map of FIG. 7 at index 0, the simpleMap(0) method is invoked to map the data at index 0 of the stored format to index 0 of the desired format. This mapping is achieved by placing the call to simpleMap(0) at index 0 of the desired format for the particular data source, as shown in FIG. 8. Thus, rather than accessing the data directly in the desired format of FIG. 7, the mapped row of FIG. 8 invokes the simpleMap(0) method when the data is required. The SimpleMap class also defines a method mapFrom( ) that returns the data from the stored format that corresponds to the passed index of the desired format. This method is invoked by other methods in FIGS. 13–17.

The specific Java pseudo-code implementation for the PhoneAddDashesMap class is shown in FIG. 13. The mapFrom( ) method is overridden in this class to define a new mapping that creates a string buffer with the phone number without dashes, and adds dashes after the third and seventh digit.

The specific Java pseudo-code implementation for the ParseNameMap class is shown in FIG. 14. The full string is retrieved from the CDROM index 0, which includes both the name and phone number separated by a comma. The location of the comma is determined, and the string "name" is created by including all characters up to but not including the comma.

The Java pseudo-code implementation of the ParsePhoneMap class is shown in FIG. 15. The mapFrom( ) method takes a full string that is retrieved from the CDROM index 0, which includes both the name and phone number separated by a comma. The location of the comma is determined, and the string "phone" is created by including all characters after the comma. The implementation for the CombineAreaCodeAndPhoneMap class is shown in FIG. 16. This class includes a mapFrom( ) method that retrieves the area code, retrieves the phone number, and appends the two together in a string.

The Java pseudo-code implementation of the application is shown in FIG. 17. Once the classes and corresponding methods of FIGS. 12–16 have been implemented, the application defines a map called databaseMaps that represents the mapped row for the database format. This code creates a generic list of entries, then populates the entries with mapped rows that are used to access data in the database. In similar fashion, a map called cdRomMaps creates a list of entries with mapped rows that access CDROM data, and maps called NetworkStage1Maps and NetworkStage2Maps perform the two-stage conversion for network data represented by the nested method calls at index 1 of FIG. 10. The entries thus comprise a list of entries in the desired format (such as FIG. 7), but instead of data at the indexes, there are method calls to access the data in the different formats, as illustrated in FIGS. 8–10.

While the Java pseudo-code of FIGS. 12–17 shows the implementation of the mapFrom( ) method on each map class, it will be appreciated that two-way mapping is possible within the scope of the invention by implementing both the mapFrom( ) and mapTo( ) methods in each map. Thus, a computer system 100 (FIG. 1) can retrieve data from a stored format by calling the appropriate mapFrom( ) methods, and can likewise store data in a stored format by calling the appropriate mapTo( ) methods.

The apparatus and method in accordance with the preferred embodiments thus provide a user-extensible framework for accessing data in different formats. Once the user extends the framework to implement a desired data format mapping environment, the application may access data in a common desired format, regardless of the format of the one or more data sources that are accessed to gather the data. A data format mapping mechanism in accordance with the preferred embodiments thus provides dynamic mapping of data from one or more stored formats to a desired format when needed, rather than converting an entire database. Because the data format mapping mechanism is an extensible framework, a programmer may customize the data format mapping mechanism as desired to define a particular data format mapping environment that will meet specific needs.

While the invention has been particularly shown and described with reference to preferred embodiments thereof, it will be understood by those skilled in the art that various changes in form and details may be made therein without departing from the spirit and scope of the invention.

I claim:

1. An apparatus comprising:
   at least one processor;
   a memory coupled to the at least one processor; and
   an object oriented data format mapping framework mechanism residing in the memory and executed by the at least one processor, the data format mapping framework mechanism including at least one mapped row that defines a plurality of indexes in a desired format for mapping data from at least one stored format into the desired format, each mapped row including a method call at each mapped row index to dynamically convert data in the at least one stored format into the desired format when the data in the desired format is required.

2. The apparatus of claim 1 wherein the data format mapping framework mechanism further comprises at least one map that defines the method call at each mapped row index.

3. The apparatus of claim 2 wherein a user extends the data format mapping framework mechanism to define a data format mapping environment by defining the at least one mapped row and by defining the at least one map.

4. The apparatus of claim 1 wherein the data format mapping framework mechanism comprises a row class, a mapped row class that is a subclass of the row class, and a map class.

5. The apparatus of claim 4 wherein the row class and the map class are abstract classes of the framework mechanism.

6. The apparatus of claim 1 wherein each method dynamically retrieves data from the stored format into the desired format when data in the desired format is required.

7. A method for mapping data stored in at least one stored format to a desired format, the method comprising the steps of:
   extending an object oriented data format mapping framework mechanism to define at least one map class and at least one mapped row class, the at least one mapped row class defining a plurality of indexes in a desired format, each mapped row including a method call at each mapped row index to dynamically perform the mapping of data stored in the at least one stored format to the desired format when the data in the desired format is required; and
   executing the extended data format mapping framework mechanism on an apparatus.

8. The method of claim 7 further including the step of generating at least one mapped row in the desired format, each method call at each mapped row index comprising a call to a method on the at least one map class.

9. The method of claim 7 further including the step of dynamically calling the methods at each mapped row index when data is required in the desired format.

10. A method for providing a data format mapping environment in an object oriented system that allows a software application to access in a desired format data stored in at least one stored format, the method comprising the steps of:
    a user extending an object oriented data format mapping framework mechanism by defining at least one concrete subclass of a map class; and
    a user extending the framework mechanism to define at least one mapped row that defines a plurality of indexes in a desired format, each mapped row including a method call at each mapped row index to dynamically convert data in the stored format into the desired format when the data in the desired format is required;
    the combination of the at least one concrete subclass of the map class and the at least one mapped row defining the data format mapping environment.

11. A program product comprising:
    an object oriented data format mapping framework mechanism residing in the memory and executed by the at least one processor, the data format mapping framework mechanism including at least one mapped row that defines a plurality of indexes in a desired format for mapping data from at least one stored format into the desired format, each mapped row including a method call at each mapped row index to dynamically convet data in the at least one stored format into the desired format when the data in the desired format is required; and
    signal bearing media bearing the object oriented data format mapping framework mechanism.

12. The program product of claim 11 wherein the signal bearing media comprises recordable media.

13. The program product of claim 11 wherein the signal bearing media comprises recordable media.

14. The program product of claim 11 wherein the data format mapping framework mechanism further comprises at least one map that defines the method call at each mapped row index.

15. The program product of claim 11 wherein the data form at mapping framework mechanism comprises an extensible object oriented framework mechanism that defines a desired data format mapping environment when a user extends the framework mechanism by defining at least one concrete subclass of a map class and by defining the least one mapped row.

16. The program product of claim 11 wherein the data format mapping framework mechanism comprises a row class, a mapped row class that is a subclass of the row class, and a map class.

17. The program product of claim 12 wherein the data format mapping framework mechanism comprises a row class, a mapped row class that is a subclass of the row class, and a map class.

18. The program product of claim 11 wherein each method dynamically retrieves data from the stored format into the desired format when data in the desired format is required.

19. The apparatus of claim 1 wherein the data format mapping framework mechanism, when executed by the at least one processor, maps data from the stored format to the desired format when required and also maps data from the desired format to the stored format when required.

20. The apparatus of claim 1 wherein the data format mapping framework mechanism maps data from a plurality of stored formats to the desired format when executed on the at least one processor.

21. The method of claim 7 further comprising the step of:
the extended data format mapping framework mechanism converting data from the stored format to the desired format when required and from the desired format to the stored format when required.

22. The method of claim 7 further comprising the step of:
defining a plurality of maps that each convert the data from a corresponding plurality of stored formats into the desired format, the extended data format mapping framework mechanism converting data from the plurality of stored formats to the desired format.

23. The program product of claim 11 wherein the data format mapping framework mechanism maps data from the stored format to the desired format and also maps data from the desired format to the stored format when the program product is executed on an apparatus.

24. The program product of claim 11 wherein the data format mapping framework mechanism maps data from a plurality of stored formats to the desired format when the program product is executed on an apparatus.

* * * * *

UNITED STATES PATENT AND TRADEMARK OFFICE
CERTIFICATE OF CORRECTION

PATENT NO. : 6,038,565
DATED : Mar. 14, 2000
INVENTOR(S) : Clifton Malcolm Nock

It is certified that error appears in the above-identified patent and that said Letters Patent is hereby corrected as shown below:

Claim 11, Col. 10, Line 51, "convet" should be --convert--.

Claim 13, Col. 10, Line 60, "recordable" should be --transmission--.

Claim 15, Col. 10, Line 66, "form at" should be --format--.

Claim 17, Col. 11, Lines 10-13, "The program product of claim 12 wherein the data format mapping framework mechanism comprises a row class, a mapped row class that is a subclass of the row class, and a map class." should be --The program product of claim 16 wherein the row class and the map class are abstract classes of the framework mechanism.--

Signed and Sealed this

Twenty-third Day of January, 2001

Attest:

Q. TODD DICKINSON

Attesting Officer

Commissioner of Patents and Trademarks